United States Patent [19]

Palme

[11] 4,102,444
[45] Jul. 25, 1978

[54] STEPPED TORQUE ROTARY MOTION BRAKE

[75] Inventor: Karl Palme, Greendale, Wis.

[73] Assignee: Wehr Corporation, Milwaukee, Wis.

[21] Appl. No.: 751,647

[22] Filed: Dec. 16, 1976

[51] Int. Cl.² .................. F16D 65/30; B60T 7/12
[52] U.S. Cl. ..................... 188/72.1; 188/106 P;
188/171; 188/180; 188/187; 192/2; 192/103 A;
310/77; 318/372
[58] Field of Search .................. 188/72.1, 166, 105,
188/171, 173, 187, 180, 106 P, 71.5; 310/77;
318/372, 369; 192/103 A, 2

[56] References Cited

U.S. PATENT DOCUMENTS

| 1,172,917 | 2/1916 | Thomas | 188/171 |
|---|---|---|---|
| 1,924,320 | 8/1933 | James | 188/171 X |
| 1,969,435 | 8/1934 | Thurston | 188/171 |
| 2,833,975 | 5/1958 | Currie | 318/369 |
| 2,964,137 | 12/1960 | Luedtke et al. | 188/171 X |
| 3,172,626 | 3/1965 | Haber et al. | 188/271 X |
| 3,830,344 | 8/1974 | Cervenec et al. | 188/171 |
| 3,999,634 | 12/1976 | Howell | 188/106 P X |

*Primary Examiner*—George E. A. Halvosa

[57] ABSTRACT

Rotatable discs are splined on a hub member and alternately arranged with stationary discs secured to the brake housing to form a brake disc assembly. The brake operator assembly is a combination electromagnet release, spring set assembly associated with a pressure plate and operative to selectively move the pressure plate into and out of engagement with the brake disc assembly for braking the assembly against and releasing the assembly for rotation. Primary torque springs are actuable, when the electromagnet is de-energized, for biasing the pressure plate into engagement with the brake disc assembly. Secondary torque springs are held against actuation to so bias the pressure plate by axially movable guide rods which include outer end portions engageable with outer fixed shoulders to hold the guide rods in a latched position. The secondary torque springs are actuated when the end portions of the guide rods are moved or cammed to an unlatched position, i.e. out of engagement with the shoulders. A circuit including an emergency stop switch is provided for deenergizing the electromagnets when the guide rods are cammed to the unlatched position. A governor secured to a hub brake shaft and including radially slidable centrifugally and spring biased camming arms is provided for camming the guide rods to the unlatched position and actuating the secondary torque springs in response to the speed of rotation of the brake disc assembly being reduced to a predetermined lower speed after actuation of the primary torque springs. The camming arms are also operative to cam the guide rods to the unlatched position for simultaneously actuating the primary and secondary torque springs in response to the brake disc assembly rotating at a speed above a predetermined upper or safe limit.

8 Claims, 7 Drawing Figures

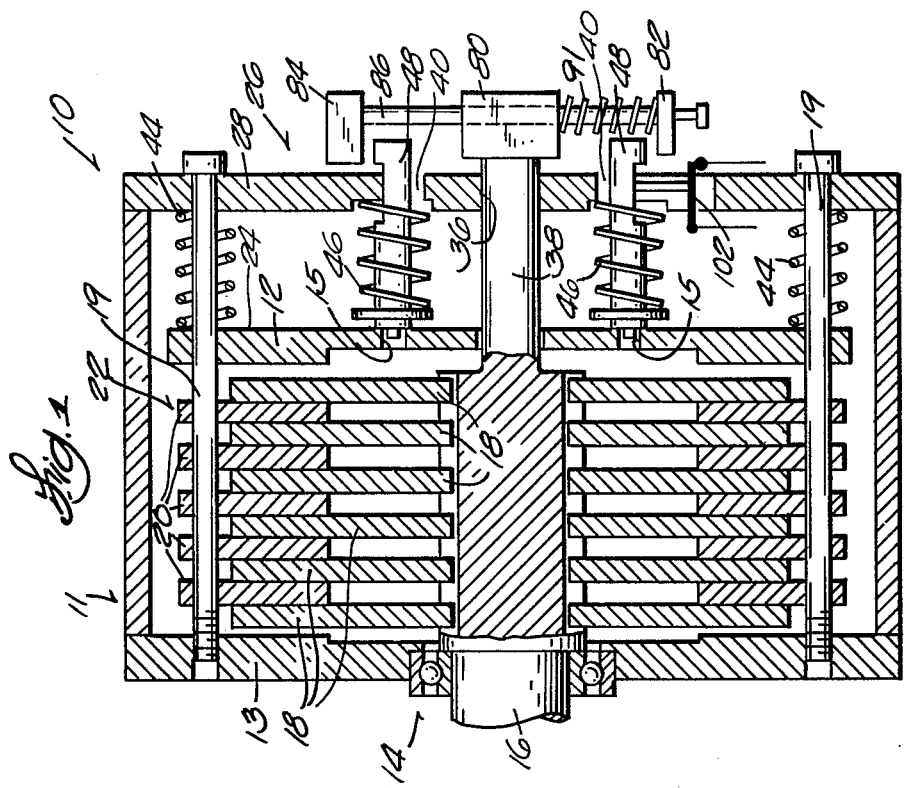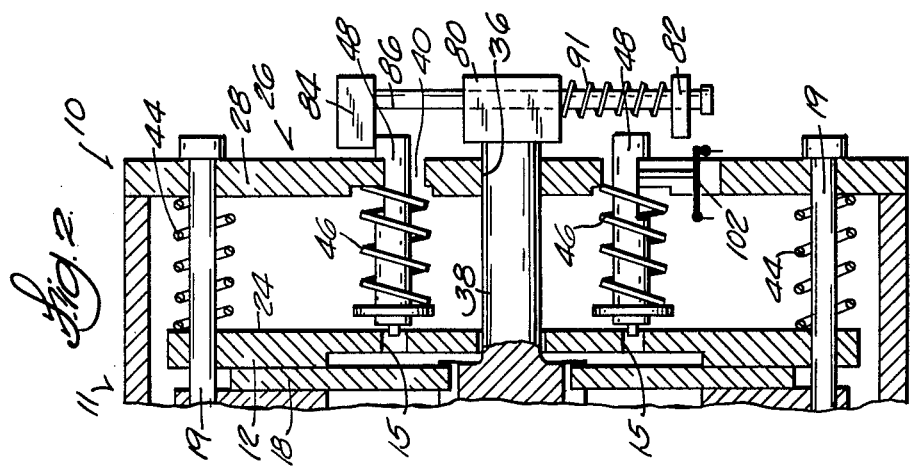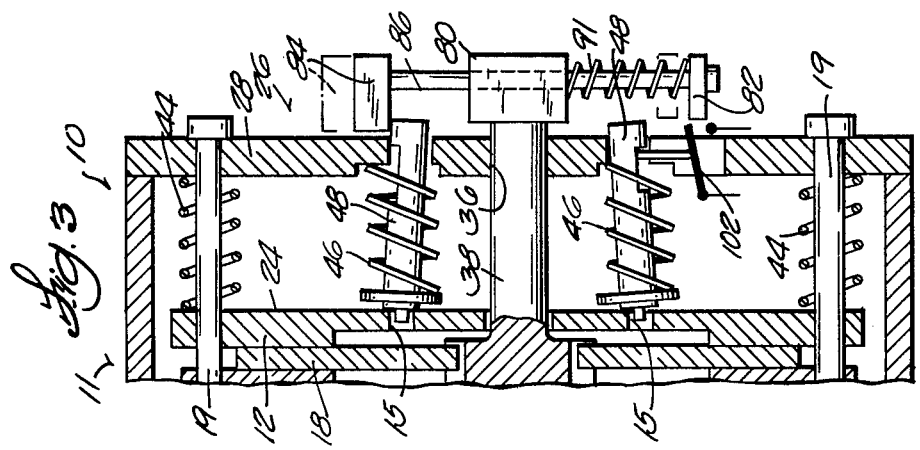

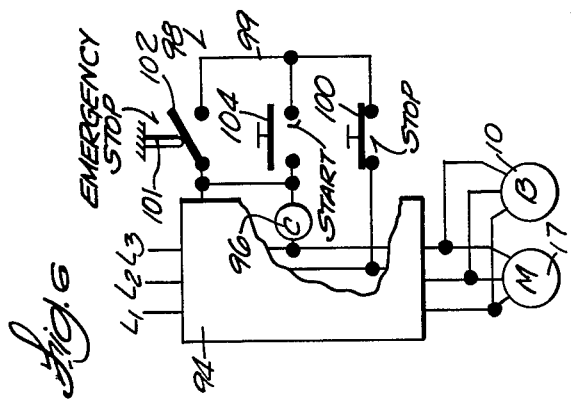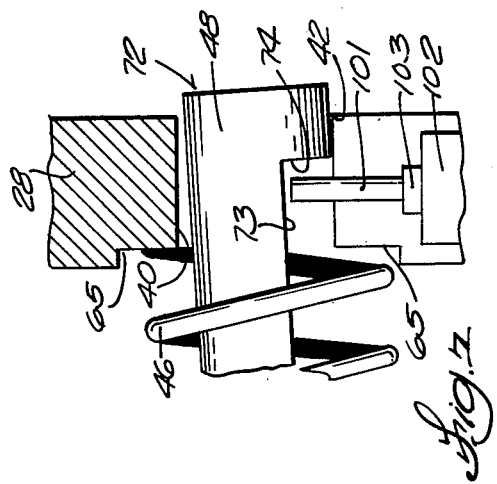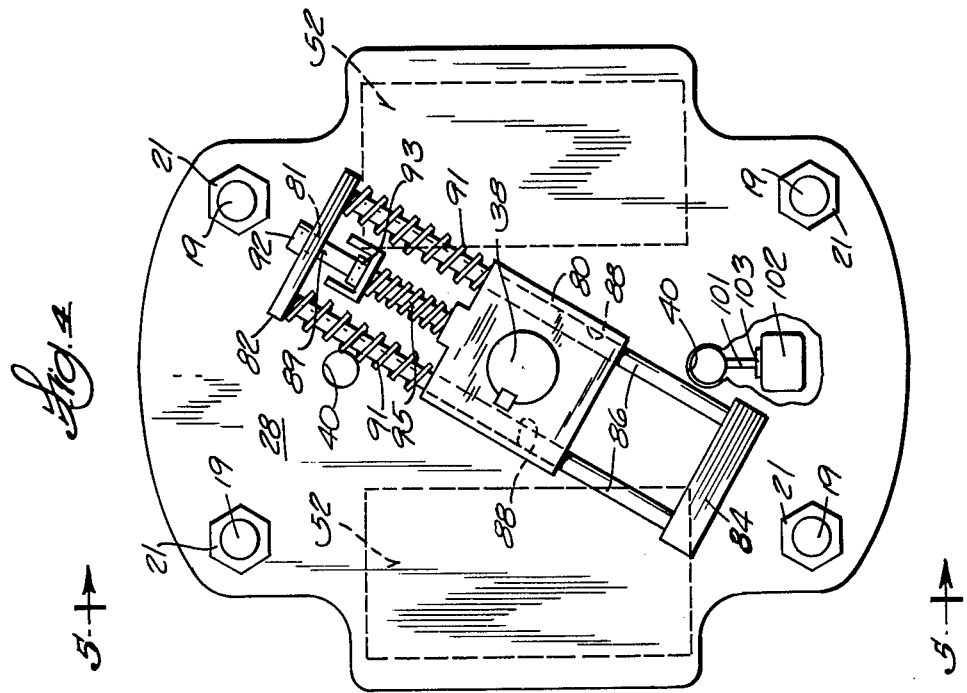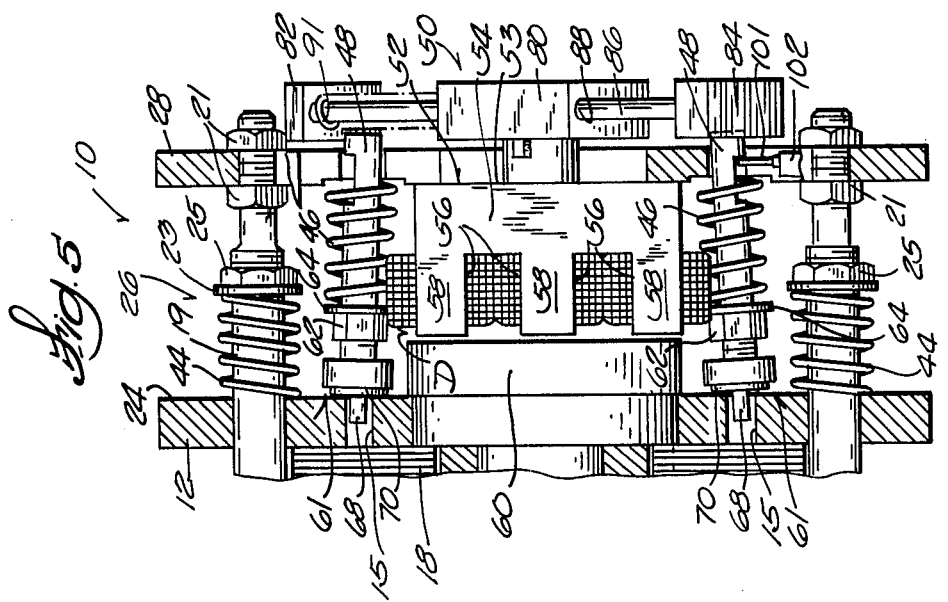

STEPPED TORQUE ROTARY MOTION BRAKE

BACKGROUND OF THE INVENTION

I. Field of the Invention

This invention relates to apparatus for controlling rotary motion, and more particularly, to a disc-type brake of the spring set electromagnetic release-type and to an improved operator assembly for setting and releasing the brake.

II. Description of the Prior Art

Disc-type brakes of the type to which this invention relates have encountered general acceptance due to their compactness, economy of construction and reliability. They have presented problems, however, in that brakes designed to provide relatively high retarding torque generally also exhibit relatively fast, generally fixed braking or setting times. Such fast or abrupt braking time is undesirable in brakes utilized, for example, with motors driving escalators, hoists, ski lifts, or other devices which require relatively high retarding torque to fully brake the load, but wherein a more gradual braking or setting time is preferred for safety or other reasons.

Various prior art disc-type brakes have been provided which afford adjustment of setting or braking time. One example may be found in U.S. Pat. No. 3,682,279 issued Aug. 8, 1972 and assigned to the assignee of this application. The structure of that patent utilized an inclined camming surface and damped solenoid arrangement to provide a gradually increasing retarding torque or braking action. Such a damped solenoid arrangement is not a complete solution.

This invention is concerned with this general area and has among its objects to provide a disc-type brake which eliminates the above noted and other disadvantages of the prior art.

More specifically, the invention has among its objects to provide a disc-type brake which achieves a relatively high retarding torque, but which also provides a relatively more gradual application of that torque along with a more gradual normal braking or setting time. Further, the invention has among its objects to provide such a disc-type brake wherein a relatively more abrupt emergency braking is achieved when the speed of rotation of the motor or other device being braked increases over a predetermined upper or safe limit.

SUMMARY OF THE INVENTION

The invention disclosed herein provides a rotary motion control apparatus for braking rotation of an electric motor or other rotating device. The apparatus provides a relatively high retarding or braking torque, but affords a stepped application of the retarding torque to provide a relatively more gradual braking or setting time. The apparatus also automatically provides a full application of the relatively high retarding torque to provide more abrupt braking in response to an emergency overspeed motor condition.

The rotary motion control apparatus comprises a rotatable member, pressure plate means, and operator assembly means comprising first and second spring means separately actuable for applying first and second forces biasing the pressure plate means into engagement with the rotatable member. Holding means, such as electromagnetic means, is selectively operable for moving the pressure plate means out of engagement with the rotatable member against the bias of the first spring means. The operator assembly also includes governor means operable for actuating the second spring means in a predetermined manner after actuation of the first spring means, whereby the operator assembly affords a stepped application of first and second retarding torques to gradually brake rotation of the rotatable member.

More specifically, the rotary motion control apparatus embodying this invention comprises a stepped torque rotary motion brake including a brake disc assembly having rotatable discs splined on a hub member and alternately arranged with stationary discs secured to the brake housing. The operator assembly includes electromagnets secured to a front plate and associated with a pressure plate to selectively move the pressure plate out of engagement with the brake disc assembly for releasing the assembly for rotation. The first spring means, or primary torque springs, are compressed between the pressure plate and front plate and are actuable, when the electromagnets are de-energized, for moving the pressure plate into engagement with and applying a first retarding torque to the rotatable discs of the brake disc assembly.

The second spring means, or secondary torque springs, are supported on axially movable guide rods which include inner end portions having guide means for moving against the pressure plate, and spring retaining means, and outer end portions including notches having outer lips engageable with outer shoulders of apertures in the front plate to hold the guide rods in a latched position and the secondary torque springs against actuation. The secondary torque springs are released for operation when the end portions of the guide rods are moved or cammed to an unlatched position, thereby affording secondary torque springs forcing the guide means of the guide rods toward the pressure plate for applying a second retarding torque to the brake disc assembly.

The operator assembly also includes a magnetic starter including a starter coil for energizing the electric motor and the electromagnets, and circuit switching means including a control circuit having an emergency stop switch provided for de-energizing the electromagnets when the guide rods are cammed to the unlatched position. A momentary start switch is provided to override the emergency stop switch during starting of the electric motor.

The operator assembly also includes governor means secured to a brake shaft for rotation with the hub. The governor means comprises a central member having a connecting rod slidably engaged in apertures extending therethrough for radial movement. The governor means also includes camming means which comprises a first camming arm and a relatively heavier weight, second camming arm secured to opposite ends of the connecting rod. Spring means are provided for biasing the relatively lighter weight first camming arm radially outward with respect to the central member.

During normal braking operation, the second camming arm moves or cams the guide rods to the unlatched position and actuates the secondary torque springs in response to the speed of rotation of the brake disc assembly or rotatable discs, i.e. when the speed is reduced to a predetermined lower speed after actuation of the primary torque springs.

Automatic emergency overspeed braking operation is achieved by the first camming arm moving or camming the guide rods to an unlatched position to open the emergency stop switch and hence, simultaneously actuate the primary and secondary torque springs in response to the brake disc assembly rotating at a speed above a predetermined upper or safe limit.

Other features and advantages of the embodiments of the invention will become known by reference to the following general description, the appended claims and drawings.

BRIEF DESCRIPTION OF THE DRAWINGS

FIG. 1 is a side elevational view taken in cross section of a brake embodying the invention, the operator assembly of the brake being shown schematically and with the electromagnets removed.

FIG. 2 is a view similar to FIG. 1 showing the brake in a different stage of operation.

FIG. 3 is a view similar to FIG. 1 showing the brake in another different stage of operation.

FIG. 4 is a detailed front plan view of the brake shown in FIG. 1.

FIG. 5 is a detailed sectional view of the operator assembly of the brake shown schematically in FIGS. 1-3, and is taken along lines 5—5 of FIG. 4.

FIG. 6 is a diagrammatic view of a magnetic starter and circuit switching means for the brake shown in FIG. 1.

FIG. 7 is an enlarged sectional view of a portion of the operator assembly shown in FIG. 5.

DESCRIPTION OF THE PREFERRED EMBODIMENT

Referring more particularly to the drawings wherein like numerals refer to like parts throughout the several views, FIG. 1 shows a disc-type brake 10 having a frame 11 including a rear mounting plate 13 in which hub 14 is suitably journaled. The hub 14 is conventionally connected to a shaft 16 of, for example, an electric motor 17 (shown schematically in FIG. 6). One or more rotatable members, friction discs 18, are secured to or splined on hub 14 for rotation therewith and for axial movement. As best shown in FIG. 1, rotatable discs 18 are preferably alternately arranged with stationary members, discs 20, which are suitably held against rotation with respect to the hub 14 but are movable axially on studs 19 (described below).

While various pressure plate arrangements could be utilized, the brake 10 preferably includes a pressure plate 12 having a pair of laterally spaced apertures 15, the purpose of which apertures will be described below. The rotatable discs 18 and the alternately arranged stationary discs 20 (preferably numbering one less than the number of rotatable discs 18) provide a brake disc assembly 22 which is selectively clamped or set by engagement with the pressure plate 12 to brake the motor 17 against rotation. More specifically, operator assembly means generally designated 26, is provided for selectively moving the pressure plate 12 into and out of engagement with the brake disc assembly 22 to alternately brake the motor against and release the motor for rotation. The amount of retarding torque the pressure plate 12 exerts on the brake disc assembly 22 or rotatable discs 18 and motor 17, and hence the braking or setting time, is generally proportional to the amount of force which biases or urges the pressure plate into engagement with the brake disc assembly.

As will be described in more detail below, in order to provide the brake 10 with both a relatively high retarding torque and a gradual braking or setting time, the operator assembly 26 includes first and second spring means which are separately actuated in a predetermined manner by electromagnetic means and governor means to sequentially increase the force which biases the pressure plate 12 into engagement with the brake disc assembly 22. Thus, the operator assembly 26 affords the stepped application of first and second retarding torques to the brake disc assembly to gradually brake rotation of the motor 17.

The operator assembly 26 includes a front plate 28 which is secured to the rear mounting plate 13 by four spaced studs 19 which pass through apertures in the front plate and are threaded into apertures in the rear mounting plate 13. The studs 19 also pass through apertures in the stationary discs 20 and in the pressure plate 12 to permit axial movement while preventing rotational movement of the stationary discs and pressure plate with respect to the rear mounting plate 13.

As shown in the detailed view in FIG. 5, the studs 19 each include a pair of lock nuts 21 located on opposite sides of the front plate 28. As will be described below, the lock nuts 21 threadingly engage the studs 19 to afford adjustment of the distance or spacing between the front plate 28 and the pressure plate 12 which is clamped against the brake disc assembly 22 which, in turn, is clamped against the rear mounting plate 13 during a braking operation.

The front plate 28 includes a central aperture 36 through which a brake shaft 38 extends. The brake shaft 38 can be an extension of the motor shaft 16 or a separate shaft secured to the hub 14. The front plate 28 also includes a pair of laterally spaced apertures 40 having outer surfaces or shoulders 42 (see FIG. 7). Apertures 40 are generally aligned with apertures 15 in pressure plate 12, but are laterally spaced apart slightly less than the spacing between apertures 15. Detents 65 are formed in front plate 28 and these are centered on apertures 15 but offset relative to apertures 40. Front plate 28 also includes an emergency stop switch 102 having a spring biased plunger 103, and a slidable linkage or pin 101 which rests against the plunger 103 and which slidably extends transversely into one of the apertures 40.

The first spring means of the operator assembly means 26 preferably comprises compression springs or primary torque springs 44 which are supported on the studs 19 and are compressed between washers 23 and the outer surface 24 of the pressure plate 12. The washers 23 are held against axial movement by stop nuts 25 on studs 19.

The second spring means preferably comprises compression springs or secondary torque springs 46 which are supported on a pair of laterally spaced guide or control rods 48 which extend into and between the offset apertures 15 and 40 of the pressure plate 12 and the front plate 28, respectively.

As best shown in the detailed view of FIG. 5, the guide rods 48 have inner end portions 61 including spring retaining means such as stop nuts 62 and washers 64 mounted on the guide rods. The inner end portions 61 also include guide means such as pins 68 and flanges 70 which are integrally formed or suitably secured to the guide rods. The secondary springs 46 are compressed between the washers 64 and the detents 65 of the front plate 28 so that the pins 68 always at least partially extend into the apertures 15 of the pressure plate 12, and so that the circular flanges 70 are centered and biased against the outer surface 24 of the pressure plate 12 during normal running or free rotation of the motor 17, and during actuation of the secondary torque springs 46 (described below).

As best shown in FIG. 7, the guide rods 48 have outer end portions 72 which are dimensioned to slide axially into and extend through the laterally spaced front plate apertures 40. The outer end portions 72 include notches 73 having outer lips 74 which, as will be described in more detail below, are engageable with the outer shoulders 42 of the front plate apertures 40 to hold each of the guide rods 48 in a latched position. The engagement of the outer lips 74 with the outer shoulders 42 prevents actuation of the secondary torque springs 46, i.e. the inward axial movement of the guide rods 48 is limited such that the circular flanges 70 are not applying a biasing force against the outer surface 24 of the pressure plate 12 after the pressure plate 12 has been axially displaced and biased into engagement with the brake disc assembly 22 by the primary springs 44.

The operator assembly 26 includes electromagnetic means, generally designated 52, connected to the front plate 28 and to the pressure plate 12. The electromagnetic means is operative, when energized, to resist the force and bias of the first and second spring means and to attract or displace the pressure plate 12 out of engagement with the brake disc assembly 22 to release the motor 17 for rotation.

As best shown in FIGS. 4 and 5, the electromagnetic means 52 preferably comprises a pair of laterally spaced electromagnets 53 each including E-frame cores 54 suitably connected to the front plate 28 by means such as welding. Although a single coil, single voltage arrangement could be utilized, three separate coils 56 are preferably wound around the three legs 58 of each of the E-frame cores 54 and are suitably wired to receive power from the line terminals of a three phase voltage source (see FIG. 6). The electromagnets 53 each include armatures or rectangular plates 60 suitably secured to the pressure plate 12 and disposed adjacent the ends of the core legs 58.

The amount of actual displacement of the pressure plate 12 is equal to the width of the gap "D" between the ends of the E-frame core legs 58 and the adjacent surface of the armatures or plate 60, the gap "D" existing when the electromagnets 53 are de-energized. The gap "D", which may increase during use of the brake 10 due to frictional wear of the brake disc assembly 22, should be maintained within a given range, dependent on the specific characteristics of the electromagnets utilized and the strength or size of the primary and secondary torque springs. The gap "D" can be maintained manually within the given range by, for example, suitable rotatable adjustment of the lock nuts 21 which are located on opposite sides of the front plate 28 and on the studs 19.

As shown diagrammatically in FIG. 6, the brake 10 preferably includes a magnetic starter 94 which is conventional in nature and includes a starter coil 96 which is energized through selective operation of circuit switching means 98 to energize or start the motor 17 and energize the electromagnetic means 52 of the brake 10. More specifically, energizing the starter coil 96 results in suitable coupling of the windings of the motor 17 (not shown) and the coils 56 of the electromagnets 53 to the line terminals L1, L2 and L3 of a three-phase voltage source (not shown). It is to be understood that the electromagnetic means of brake 10 could be coupled to the line terminals of the three-phase voltage source or energized separately from the motor 17 by use of means other than the starter coil 96, for example, by use of a three-pole relay coupled in the control circuit of the circuit switching means 98 (described below).

The circuit switching means 98 preferably comprises a control circuit 99 which, when closed or completed, energizes the starter coil 96 by coupling it across, for example, line terminals L2 and L3 of the three-phase voltage source. The circuit 99 includes a normal stop switch 100 which is movable from a closed position to a position opening the circuit 99 to de-energize the starter coil 96, and hence to de-energize the motor 17 and the electromagnetic means 52 of the brake 10. The control circuit 99 further includes the emergency stop switch 102 (described earlier) having the spring biased plunger 103 which is also movable to a position opening the circuit 99, and which, as will be described in more detail below, can automatically de-energize the motor and the electromagnetic means 52 of the brake 10 in the event of an emergency overspeed motor condition.

The circuit 99 also includes a momentary start switch 104 which is coupled in parallel across the emergency stop switch 102 and which is temporarily movable from a normally open position to a closed position completing the circuit 99 (assuming the stop switch 100 is closed) in order to override or short out the emergency stop switch 102 which, as will be explained below, is in an open position during starting of the electric motor 17.

Referring more particularly to the operation of the components of the brake 10 already described, after the stop switch 100 is closed, the momentary start switch 104 can be moved to the closed position to complete the circuit 99 so that the starter coil 96 energizes the motor 17 and the electromagnets 53 of the brake 10. The electromagnets 53 are operative, when energized, to resist the bias of the primary and secondary torque springs 44 and 46 and attracts and displaces armatures 60, and hence the pressure plate 12 secured thereto, out of engagement with the brake disc assembly 22 to allow the motor 17 to rotate freely.

When the motor 17 is started and the electromagnets 53 are energized, the circular flanges 70 of the guide rods 48, which are biased against the pressure plate 12, are also axially outwardly displaced along with the pressure plate 12 such that the outer end portions 72 of the guide rods are eventually displaced from an unlatched position (see FIG. 3) to a reset position (see FIG. 1).

More specifically, the guide rods 48 are influenced by springs 46 in that the springs tend to bias the rods to a position wherein the rods are centered on apertures 15 and relative to detents 65. When the electromagnets 53 are energized, the guide rods tend to center and extend perpendicularly with respect to the pressure plate. As the pressure plate is displaced axially outward, the outer lips 74 of the outer end portions 72 slide axially outward beyond the outer shoulders 42 of the front plate apertures 40 so that the centering force exerted on the control rods 48 tends to snap the control rods to a reset position, i.e. to a position wherein the outer lips 74 are slightly axially spaced from, but overlap the outer shoulders 42 of the apertures 40 (see FIG. 1).

After the motor 17 has reached its nominal or regular operating speed, the brake 10 can be normally actuated by selective operation of the circuit switching means 98 to provide gradual braking of the motor 17. More specifically, when the electromagnetic means 52 is de-energized by moving the stop switch 100 to open the control circuit 99, the armatures 60 and pressure plate 12 are released for inward axial movement. Thus, the primary torque springs 44 are actuated and apply a first force displacing and biasing the pressure plate 12 into engagement with the adjacent rotatable disc 18 and brake disc assembly 22, whereby a first retarding torque is applied to the brake disc assembly 22 for braking rotation of the motor 17.

During such a normal braking operation, as the pressure plate 12 is axially displaced toward the brake disc assembly, the secondary torque springs 46 also momentarily tend to bias or move the control rods 48 from the reset position axially inward toward the brake disc assembly. However, before the secondary torque springs 46 are actuated, (i.e. before the lower flanges 70 of the guide rods 48 move to bias the pressure plate into engagement with the disc brake assembly 22) the outer lips 74 of the guide rods engage the outer shoulders 42 of the apertures 40 to hold the guide rods 48 in a latched position against further axial movement. The guide rods 48 remain in this latched position until the governor means 50 (described below) moves the control rods to an unlatched position, thereby actuating the secondary torque springs 46, i.e. affording axial movement of the guide rods 48 so that the secondary torque springs 46 apply a second force through the circular flanges 70 to further bias pressure plate 12 into engagement with the brake disc assembly, whereby a second retarding torque is additionally applied to the brake disc assembly to brake rotation of the motor.

Before describing the specific structure and operation of the governor means 50 illustrated in the drawings, it is to be understood that various other mechanical and electromechanical governor means or other arrangements could be utilized to move the outer end portions of the control rods 48 from the latched to the unlatched position in a predetermined manner or time after actuation of the first spring means. For example, a timed relay and solenoid arrangement could be utilized. Further, although the secondary spring means 44 are specifically described as being supported on control rods 48, other arrangements to support the secondary torque springs and to cooperate with other governor means could be utilized to afford a stepped application of first and second retarding torques to the brake disc assembly to gradually brake the motor 17.

Referring particularly to FIGS. 4 and 5, the governor means 50 preferably comprises a centrifugally activated spring biased device including camming means for moving the control rod 48 to an unlatched position. More specifically, the governor means 50 preferably includes a central member 80 secured to the brake shaft 38 for coincident rotation with the motor 17. The governor means includes camming means radially slidably secured to the central member 80 and biased such that the camming means moves the guide rods to the unlatched position in response to the speed of rotation of the motor 17 being reduced to a predetermined lower speed after actuation of the primary torque springs 44.

While various arrangements are possible, the camming means preferably comprises a first camming arm 82 and a second relatively heavier camming arm 84. The camming arms are spaced apart and secured to the opposite ends of connecting rods 86 which are radially slidably engaged within apertures 88 extending through the central member 80. The governor means also includes a center rod 89 connected to the central member 80 and which extends through an aperture 81 in the first camming arm 82. The center rod 89 includes an outer flange or stop 92 and an inner flange or stop 93. The inner and outer stops are located on opposite sides of the first camming arm 82 to regulate the extent of radial movement or travel of the differently weighted camming arms with respect to the central member 80.

The governor means 50 includes bias means in the form of compression springs 91 supported on the connecting rods 86 and extending between the central member 80 and the first camming arm 82. The compression springs 91 bias the first camming arm 82 radially outward with respect to the central member 80, the outward movement of the first camming arm 82 being limited by the outer stop 92. When the central member 80 rotates coincidentally with the motor 17, centrifugal force tends to move the relatively heavier second camming arm 84 radially outward against the bias of the compression springs 91, and eventually, against the bias of a third compression spring 95 supported on the center rod 89, the movement of the camming arm 84 being limited by the inner stop 93. The relative weighting of the first and second camming arms 82 and 84 and the strength or size of the compression springs 91 are selected to provide the following modes of operation during normal and emergency braking operation.

NORMAL OPERATION AND BRAKING

At rest, camming arms 82 and 84 will be in the position illustrated in FIG. 4. During initial rotation arm 84 will be engaging ends 72 but the rods 48 cannot move inwardly because pressure plate 12 is being held by the electromagnet. During normal or nominal speed rotation of the motor 17 and the central member 80 of the governor means 50, the centrifugal force generated by the relatively heavier camming arm 84 tends to overcome the force of the compression springs 91. Thus, the camming arms are generally equally radially spaced with regard to the central member 80 in the normal run condition and, as shown in FIG. 1, remain out of engagement or clear the end portions 72 of the guide rods 48 while rotating. Hence, the guide rods 48 remain in the reset position.

When normal braking is desired, the stop switch 100 is moved to open the circuit 99 to brake the motor 17 and the following sequence of braking operations occurs. As noted earlier, normal opening of the circuit 99 de-energizes the magnetic means 52 resulting in release of the primary torque springs 44, whereby a first retarding torque is applied to the brake disc assembly for braking motor 17. The control rods 48 also move slightly inward to the latched position which prevents release of the secondary torque springs 46.

The normal actuation of the first spring means gradually brakes or slows the rotation of the motor 17. As the speed of rotation of the motor decreases, the centrifugal force acting on the relatively heavier second camming arm 84 decreases such that the compression springs 91 tend to move the first camming arm 82 radially outward, and hence, the second camming arm 84 coupled to the first camming arm 82 through the connecting rods 86, radially inward (see FIG. 2).

After the speed of rotation of the motor 17 has been further reduced to a predetermined lower speed, as shown in FIG. 3, the first camming arm 82 has been displaced radially inward to cam the outer end portion 72 of the control rods 48 radially inward from the latched position to the unlatched position. The guide rod outer lip 74 no longer engages or overlaps the aperture outer shoulder 42, thereby affording axial movement of the guide rods 48 and release of the secondary springs 46.

Secondary torque springs 46 result in a second retarding torque being additionally applied to the brake disc assembly 22 which combined with the first torque completes the braking operation. The high retarding torque also resists any reverse load torque which may be transmitted through the motor by the tendency of the load to back drive through the motor. In this position (FIG. 3) springs 46 are cocked, generating a bias force which will center rods 48 relative to apertures 15 and detents 65 (the reset position) when the electromagnet is again energized.

EMERGENCY BRAKING

If the speed of rotation of the motor 17 increases above the nominal or normal operating speed, the increasing centrifugal force acting on the relatively heavier second camming arm 84 will overcome the bias of springs 91 initially and subsequently that of spring 95 in moving the second camming arm radially outward, and hence the first camming arm 82 radially inward. If the speed of the motor increases above a predetermined upper or safe limit, as shown in the phantom lines in FIG. 3, the first camming arm 82 is moved radially inward to engage and move the control rods 48 from their latched to unlatched positions. The governor means 50 thereby also provides automatic, relatively more abrupt emergency braking by simultaneously actuating both the primary and secondary torque springs when the speed of rotation of the motor increases over the predetermined upper or safe limit.

More specifically, as was noted earlier, the front plate 28 includes the emergency stop switch 102 and the slidable linkage or pin 101. The pin 101 rests against the conventionally spring loaded plunger 103 which will in turn be moved by the pin to a position closing the emergency stop switch 102 when the guide rods are displaced from the unlatched position after the electromagnets are energized. The plunger 103 biases the pin 101 into the aperture 40 and moves to a position opening the switch 102 when the guide rods are cammed to the unlatched position.

During normal braking, when the guide rods 48 are moved by the second camming arm 84 to be unlatched position to actuate the secondary torque springs 46, opening of the emergency stop switch 102 has no effect since the control circuit 99 has already been opened by the stop switch 100 to de-energize the motor and electromagnets 53 of the brake 10. However, if the control rods 48 are cammed by the first camming arm 82 to the unlatched position because the speed of rotation of the motor has increased above the predetermined upper or safe limit, the opening of the switch 102 results in de-energizing the motor 17 and the electromagnets 53, thereby effecting simultaneous actuation of both the primary and secondary torque springs 44 and 46. Such simultaneous actuation results in the application of both the first and second retarding torques, a relatively high retarding torque, to more abruptly brake the rotation of the motor 17.

It is to be understood that during starting of the motor 17 (previously described) although the guide rods 48 are initially in the unlatched position, and hence the emergency stop switch 102 is open, the momentary start switch 104 can be moved to a closed position to override or short out the switch 102. When the start switch is moved to the closed position, the electromagnets are energized and hence the guide rods are displaced from the unlatched position, and the emergency stop switch is closed until the guide rods are cammed to the unlatched position during normal or emergency braking operation.

Thus, the disc-type brake 10 provides a stepped retarding torque and a more gradual braking action by opening the stop switch 100 for normal braking operation of the motor, and also provides automatic, relatively high retarding torque and a more abrupt emergency braking when the speed of rotation of the motor increases over a predetermined upper or safe limit.

It is to be understood that the invention is not confined to the particular construction and arrangement of parts herein illustrated and described, but is intended to embrace all such modified forms thereof as come within the scope of the following claims.

I claim:

1. A rotary motion brake comprising, in combination,
a frame including a rear mounting plate and a hub journaled within said rear mounting plate,
a brake disc assembly comprising at least one rotatable disc secured to said hub for coincident rotation therewith and at least one stationary disc rotatably fixed with respect to said rear mounting plate,
a pressure plate disposed adjacent and operatively associated with said brake disc assembly for movement into and out of engagement with said brake disc assembly to alternately brake said rotatable disc against and release said rotatable disc for rotation, and
operator assembly means comprising
a front plate secured in fixed relation to said rear mounting plate, and including an aperture and an outer shoulder bordering said aperture,
an axially movable guide rod including an inner end portion having spring retaining means and guide means for moving against said pressure plate, and an outer end portion which slidably axially extends outwardly through said aperture, said outer end portion having a notch including an outer lip engageable with said outer shoulder,
first spring means actuable for generating a first force biasing said pressure plate into engagement with said brake disc assembly,
second spring means supported on said guide rod and compressed between said spring retaining means and said front plate, and actuable for generating a second force in addition to said first force for biasing said pressure plate into engagement with said brake disc assembly,
electromagnetic means connected to said front plate and operative, when energized, for moving said pressure plate out of engagement with said brake disc assembly, and when de-energized, for actuating said first spring means,
said outer lip of said control rod being engageable with said outer shoulder of said aperture to hold said guide rod in a latched position when said electromagnetic means is de-energized, thereby preventing actuation of said second spring means, and
governor means including caming means operable for moving said outer lip out of engagement with said outer shoulder thereby affording inward axial movement of said guide rod to an unlatched position for actuating said second spring means in response to the speed of rotation of said rotatable disc being reduced to a predetermined lower speed after actuation of said first spring means, whereby said brake affords a stepped application of first and second retarding torques to gradually brake rotation of said rotatable disc.

2. The combination according to claim 1 wherein said electromagnetic means comprises an electromagnet including an E-frame core secured to said front plate and an armature secured to said pressure plate.

3. The combination according to claim 1
wherein said front plate includes a central aperture,
wherein said hub includes a brake shaft secured thereto and which extends through said central aperture, and
wherein said governor means is coupled to said drive shaft and said camming means is centrifugally and spring biased for moving said guide rod to said unlatched position in response to the speed of rotation of said hub being reduced to a predetermined lower speed after actuation of said first spring means.

4. The combination according to claim 3
wherein said governor means comprises
a central member secured to said drive shaft and including an aperture extending radially therethrough, and
a connecting rod radially slidably positioned through said central member aperture,
wherein said camming means includes a first camming arm and a relatively heavier second camming arm, said camming arms being connected to opposite ends of said connecting rod, and
wherein said governor means further includes spring means supported on said connecting rod and secured between said central member and one of said camming arms for outwardly radially biasing said first camming arm.

5. A combination according to claim 3
including circuit switching means including a control circuit for energizing said electromagnetic means, said control circuit including an emergency stop switch operable, when said guide rod is moved to said unlatched position, for opening said control circuit to de-energize said electromagnetic means, and
wherein said camming means of said governor means is centrifugally and spring biased to move said guide rod to said unlatched position in response to the speed of rotation of said rotatable disc increasing over a predetermined upper speed,
whereby said operator assembly means affords a simultaneous application of said first and second retarding torques to brake rotation of said brake disc assembly.

6. A combination according to claim 5
wherein said control circuit further includes a momentary start switch operable to be moved to a closed position to override said emergency stop switch and close said control circuit to energize said electromagnetic means,
whereby said pressure plate forces said guide means of said guide rod axially outwardly so that said emergency stop switch is closed and so that said outer lip of said guide rod extends outwardly beyond and overlaps said front plate outer shoulder, whereby said guide rod is moved to a reset position, said guide rod moving to a latched position wherein said outer lip engages said outer shoulder when said electromagnetic means is de-energized.

7. A combination according to claim 6
wherein said emergency stop switch includes an outwardly biased plunger movable for opening and closing said control circuit, and
wherein said front plate includes a pin which rests against said plunger and slidably extends transversely into one of said front plate apertures,
said plunger biasing said pin outwardly into said one of said apertures and opening said control circuit when said guide rod is moved to an unlatched position,
said pin and said plunger being displaced inwardly closing said control circuit when said momentary start switch is closed and said guide rod is moved from said unlatched position.

8. A combination according to claim 6,
including a magnetic starter including a starter coil which, when energized, affords energizing an electric motor braked by said apparatus, and
wherein said control circuit, when closed, energizes said starter coil,
whereby the electric motor and said electromagnetic means is energized when said control circuit is closed and the electric motor and said electromagnetic means is de-energized when said control circuit is opened.

* * * * *